United States Patent [19]

Ti et al.

[11] Patent Number: 5,757,670

[45] Date of Patent: May 26, 1998

[54] FRAME RECONSTRUCTION FOR VIDEO DATA COMPRESSION

[75] Inventors: Stephanie W. Ti, Milpitas; Charles C. Stearns, San Jose, both of Calif.

[73] Assignee: S3, Incorporated, Santa Clara, Calif.

[21] Appl. No.: 508,636

[22] Filed: Jul. 28, 1995

[51] Int. Cl.$^6$ .................................................. H04L 9/34
[52] U.S. Cl. ............................. 364/514 R; 348/412
[58] Field of Search ..................... 364/514 R, 715.02;
348/412, 416, 699; 370/58.1, 105.1; 395/114, 909

[56] References Cited

U.S. PATENT DOCUMENTS 5,162,907  11/1992  Keating et al. ........................ 348/416
5,398,079  3/1995  Liu et al. ........................ 348/699

Primary Examiner—Ellis B. Ramirez
Assistant Examiner—Thomas Peeso
Attorney, Agent, or Firm—Skjerven, Morrill, MacPherson, Franklin & Friel; Norman R. Klivans

[57] ABSTRACT

The frame reconstruction (FR) portion of an MPEG decompression circuit includes a horizontal interpolation element, a vertical interpolation element, and a selector (post processing) element. The horizontal and vertical interpolation elements are each digital filters averaging respectively two horizontal and two vertical adjacent pixels in an MPEG pixel block. Logic is included for constructing B, I, and P-type MPEG pictures. Also included is an error/warning handling mechanism.

13 Claims, 3 Drawing Sheets

| 1 begin | | | | | | |
|---|---|---|---|---|---|---|
| | | | | end 1 | 2 begin | |
| end 2 | | 3 begin | | | end 3 | 4 begin |
| | | | | | | |
| | | | | | | |
| | | | | end 4 | 5 begin | |
| | | | | | | end 5 |
| 6 begin | | | | | | |
| | | | | | end 6 | 7 begin |
| end 7 | 8 | 8 | 9 begin | end 9 | 10 begin | |
| | | | | | | |
| | | | | | | end 10 |

FRAME RECONSTRUCTION FOR VIDEO DATA COMPRESSION

CROSS-REFERENCE TO RELATED APPLICATIONS

This application is related to copending and commonly owned U.S. patent applications Ser. No. 489,488 filed Jun. 12, 1995 entitled "Decompression of MPEG Compressed Data in a Computer System" invented by Charles C. Stearns and Ser. No. 489,489 filed Jun. 12, 1995 entitled "Audio Decoder Engine" invented by Charlene Ku et al., both incorporated by reference herein in their entirety.

BACKGROUND OF THE INVENTION

1. Field of the Invention

This invention relates to video decompression and more specifically to the frame reconstruction portion of decompression of MPEG compressed video data.

2. Description of the Prior Art

MPEG (Motion Pictures Experts Group) compression of video data is well known, as is the corresponding MPEG decompression. MPEG is defined in two standards, commonly referred to as MPEG 1 and MPEG 2. See the above-referenced patent applications for further disclosure relating to the MPEG standards. The first of the above-referenced patent applications describes a "video decoder engine" for decompressing MPEG 1 compressed data. One function carried out by this video decoder engine, and which is a conventional portion of MPEG decompression, is referred to as frame reconstruction (FR). This is conventionally the last stage in MPEG decompression. While there are many well known ways to carry out frame reconstruction, typically they require a substantial amount of circuitry and may not have all of the desired flexibility. Therefore, there is a need for improved frame reconstruction both in terms of a process and a related circuit.

SUMMARY

In accordance with the present invention, frame reconstruction is carried out by logic circuitry including three main elements which are a horizontal interpolation element, a vertical interpolation element, and a post processing element. The horizontal interpolation element interpolates two adjacent (horizontally adjacent) pixels in one particular MPEG block of pixels. That is, this is a digital averaging filter. The output of the horizontal interpolation element is then provided to the vertical interpolation element which similarly interpolates (averages) two pixels which are vertically adjacent in that same MPEG block. (In another embodiment, the vertical interpolation is before the horizontal interpolation.) In the post-processing element (which is a selector) the vertically and horizontally interpolated data is processed in conjunction with externally provided IDCT MPEG decompressed data to generate the final output data.

Thus this frame reconstruction circuit reconstructs blocks or macroblocks in a video frame. The post-processing element selects and combines the horizontally and vertically interpolated data with the IDCT data, depending on the type of frame i.e., whether it is an I-type frame, P-type frame or B-type frame. To reconstruct a B-type frame for a bidirectional prediction in one embodiment, the horizontal and vertical interpolation elements are each used twice by means of a feedback path.

Also included is an error/warning correction process, by which if the bit stream is unable to be decoded in a picture layer, the VLD (a previous step in MPEG decompression) generates an error signal. A warning signal is generated under particular circumstances which require error recovery in the frame reconstruction step to reconstruct the current slice as skipped macroblocks.

Each of the three elements is comprised of standard logic elements, with a minimum gate count, so as to provide an economical solution for frame reconstruction using logic circuitry.

DETAILED DESCRIPTION OF THE PREFERRED EMBODIMENTS

This disclosure is directed to the frame reconstruction (FR) aspect of MPEG decompression. While the present disclosure is directed particularly to decompression of MPEG 1 type data, it is also applicable (with modifications of the type well-known in the art) to MPEG 2 decompression. The stages of MPEG decompression which are prior to frame reconstruction include those typically referred to as VLD, IQ, IZZ, and IDCT which in accordance with the present invention are carried out conventionally or alternatively as described in the first of the above-referenced patent applications.

As is well known, MPEG 1 includes three types of "pictures" where pictures are defined as one layer of the compressed MPEG video data. The three types of MPEG pictures are B, I, and P. P-type pictures use motion compensation to exploit temporal redundancy in the video for compression purposes. A decoder (decompression circuitry or processor) constructs a predicted block of picture elements from picture elements in a previously transmitted picture in the MPEG video data. Motion within the pictures, for instance a pan, usually implies the picture elements in the previous picture would be a different position than the picture elements in the current block, and the displacement is described by motion vectors encoded in the compressed video bit stream.

Figures 1, 2:
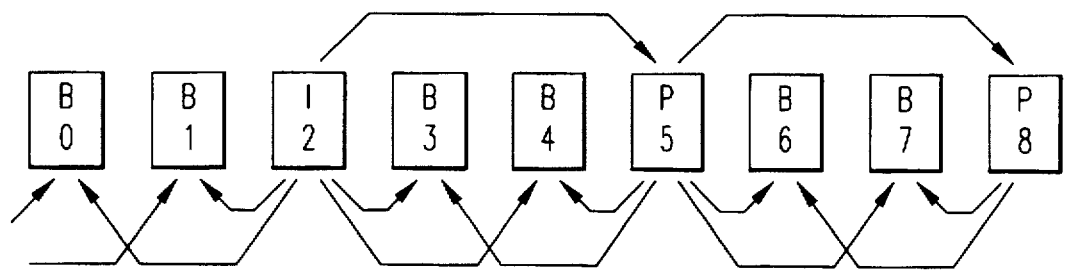
FIG. 1 shows a group of pictures in display order in accordance with MPEG compression.
FIG. 2 shows an arrangement of slices in a picture in accordance with MPEG compression.

Consider the typical group of pictures depicted diagrammatically in FIG. 1. The I picture, which is picture number 2, is decoded without requiring any motion vectors. The first P-type picture which is number 5, is decoded using the motion vectors from picture 2. This motion compensation is called the forward motion compensation since it is forward in time. (It is to be understood that time is proceeding from left to right in FIG. 1.) P picture number 8 uses forward motion compensation from picture number 5. P-type pictures always use forward motion compensation from the last transmitted I or P picture. This is all conventional in MPEG.

B-type pictures may use motion compensation from the previous I or P picture, from the next I type or P-type picture, or both, i.e., from the last two transmitted I or P-type pictures. Prediction in MPEG is called forward if reference is made to a picture ("reference frame") in the past and called backward if reference is made to a picture in the future. For example, B-type picture number 3 uses forward motion compensation from I-type picture number 2, and backward motion compensation from P-type picture number 5. B-type pictures may use forward and backward motion compensation and average the result. This operation is called MPEG interpolative motion compensation.

As is also well known, MPEG defines an additional layer in compressed video referred to as a slice. Each picture includes a number of slices where each slice consists of an integral number of MPEG macroblocks in raster scan order. Each macroblock includes a number of MPEG blocks; each block is a square array of 8 pixels×8 pixels. Slices can be of different sizes within a picture, and the division in one picture need not be the same as a division in any other picture in the compressed video bit stream. The minimum number of slices in a picture is one, the maximum number being equal to the number of macroblocks in a frame. One exemplary arrangement of slices in a picture is depicted in FIG. 2. This shows the arbitrary length of each slice within a particular picture. In this case, there are ten slices in the single picture which here corresponds to a single video frame, although that is not necessarily the case.

Figure 3:
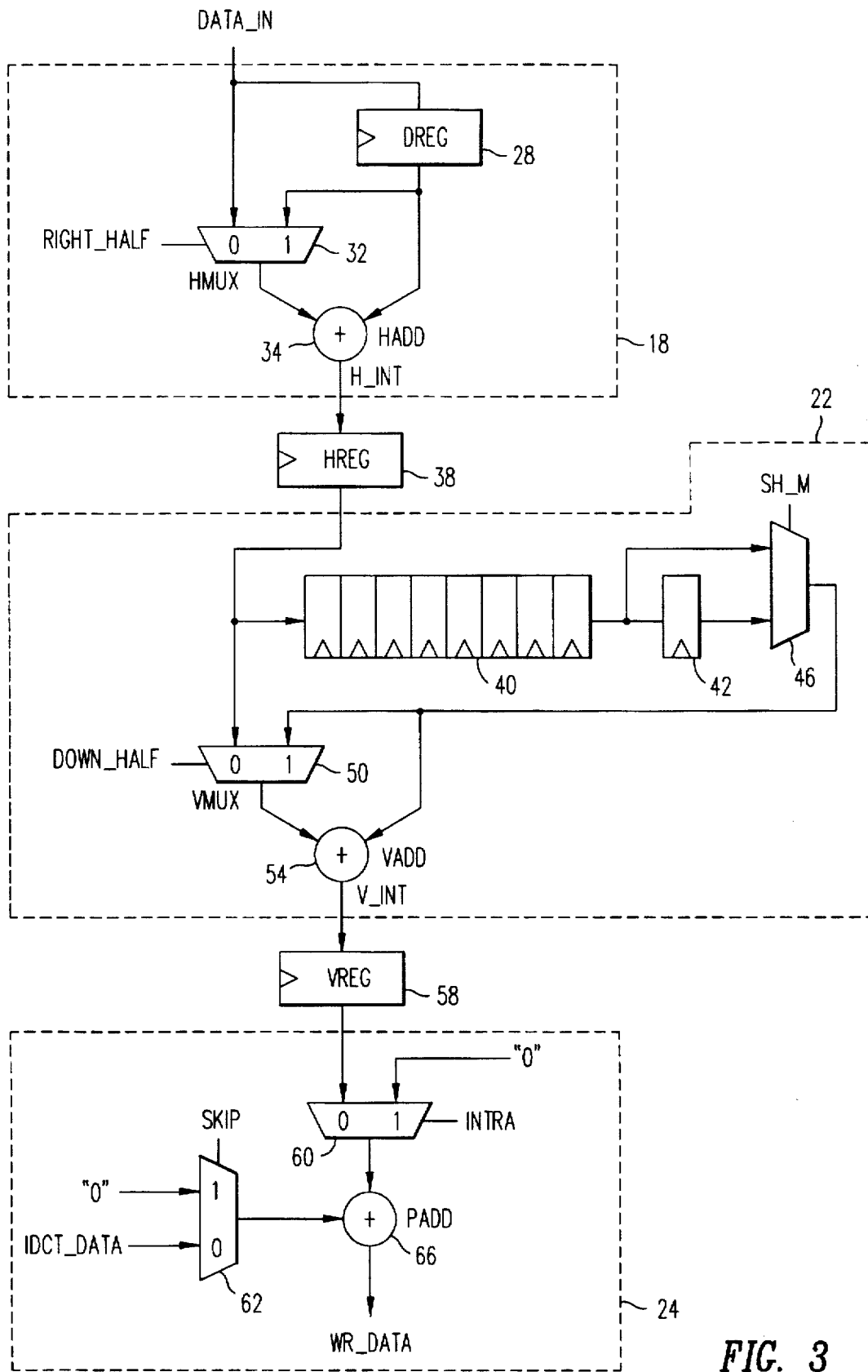
FIG. 3 shows a frame reconstruction circuit in accordance with the present invention.

FIG. 3 shows schematically a circuit for carrying out frame reconstruction in accordance with the present invention. As shown by the dotted lines, the three chief elements are horizontal interpolation element 18, vertical interpolation element 22, and post-processing (selector) element 24. The horizontal interpolation element 18 includes a D-type flip-flop (D register) 28, a two input multiplexer 32, here also labelled HMUX which is controlled by the signal RIGHT HALF, and an adder 34 here also labelled HADD which can accept additional operands for rounding and other purposes.

Incoming data (DATA IN) from the previous portions of the decompression process i.e., the IDCT portion, is latched into the D-type flip-flop 28 and then interpolated with the next incoming data, DATA IN, when signal RIGHTHALF is active (high i.e., having a logic value of one) in order to perform horizontal interpolation. Thus horizontal interpolation is an averaging or digital filtering process in accordance with the present invention. The horizontal interpolated data from adder 34 is then provided to an (optional) D-type flip-flop 38 also labelled HREG for storing horizontal interpolated data HINT.

The vertical interpolation element 22 includes a shift register including elements 40 and 42 where element 40 includes in this case eight register stages and element 42 includes one additional register stage. The multiplexer 46 is connected to receive the outputs from both element 42 and element 40 and is controlled by signal SHM. The output of multiplexer 46 is provided as a first input signal to the multiplexer 50 also labelled VMUX which is controlled by the signal DOWN HALF. The other input to multiplexer 50 is provided from the horizontal interpolation element 18 via register 38.

The output of multiplexer 50 is then provided as one input to adder 54 also labelled VADD, the other input of which is provided from the output of multiplexer 46. Adder 54 can accept additional operands for rounding and other purposes. (Other purposes would include shifting the overall value by a predetermined amount to provide an offset.) Thus the horizontally interpolated data from register 38 goes into the shift register including elements 40 and 42 and is interpolated with the signal HINT of the next line at the same vertical position when signal DOWN HALF is high. The purpose of the shift register including elements 40 and 42 is to interpolate signal HINT with that of the next line and immediately below in the block. In this case, each block is 8 pixels×8 pixels and hence an 8 pixel delay arrives at a pixel immediately under the previous pixel of interest. This provides the desired vertical interpolation or averaging, i.e. digital filtering. The number of shifts for the shift register is N if there is no horizontal interpolation or N+1, (using element 42) if there is to be horizontal interpolation.

D-type flip-flop 58, also labelled VREG, is optional for storing the vertically interpolated data VINT and serves the function described below.

The selector element 24 provides post-processing of the output signal VINT from vertical interpolation element 22. Selector element 24 includes two multiplexers respectively 60 and 62 and one adder 66 also labelled PADD. The two multiplexers are controlled separately respectively by control signals INTRA and SKIP. Multiplexer 62 accepts as an additional input the IDCT data when the SKIP signal is logic low (value 0) which is added to the register output 58 when INTRA is asserted low (value 0). Thus the vertically interpolated data VINT is processed with the input data IDCT data, and the final result WR DATA is provided as an output signal from the selector element 24.

It is to be understood that FIG. 3 depicts a circuit suitable for processing only a single data bit. In actuality at least eight such circuits are provided for a single decoder, each such circuit being identical and side by side and connected to an eight bit parallel bus carrying DATA IN and driving an eight bit parallel bus WR DATA for the output signal. As is well known in MPEG, each macroblock includes six blocks, four of which are luminance blocks and two of which are chrominance (color) blocks. Each of these blocks includes 8 pixels×8 pixels where each pixel is expressed by 8 bits of data. The circuit of FIG. 3 thus processes one pixel at a time.

The various control signals shown in FIG. 3 are provided as follows. Multiplexer 32 is driven by the signal RIGHT HALF which is decoded from the MPEG bit stream and is provided from the VLD decompression circuit. Conventionally, in MPEG 1, RIGHT HALF is provided by logic for motion vector reconstruction. If either MPEG vector RECON RIGHT FOR or RECON RIGHT BACK (each being eight bit vectors) is an odd number, and also is in a ½ pixel unit, then RIGHT HALF is asserted high (value 1).

Each of the clocked elements in FIG. 3, i.e. elements 28, 38, 40, 42, 58, is driven by the memory clock signal which drives the entire chip of which this circuit is a part. Typical clock frequencies are 40 or 50 MHz, which is conventionally provided from a crystal oscillator.

Registers 38 and 58 are optional and included for timing purposes in case the signal path is too long, to meet the cycle time requirement. The control signal SHM is derived from control signal RIGHT HALF and is e.g. a few cycles delayed version of the RIGHT HALF signal. The amount of delay is zero to N+1 cycles where N is the dimension of the block in pixels, as used above. Thus simple logic (not depicted) generates the signal SHM from the RIGHT HALF signal. The control signal INTRA controlling multiplexer 60 is a bypass signal which allows bypassing of the output of both the horizontal interpolation element 18 and the vertical interpolation element 22 by instead providing the 0 (zero) signal as an output signal from multiplexer 60 when INTRA is asserted logic high (value 1). Signal INTRA is derived from the compressed bit stream and provided from the VLD decompression circuitry.

Signal INTRA is provided as is conventional in MPEG 1. If the MPEG code word PICTURE CODING TYPE has a value of 001, then that picture is INTRA-coded, and INTRA is asserted high. If the MPEG code word MACROBLOCK INTRA has a value of 1, then that macroblock is INTRA-coded, and similarly INTRA is asserted high.

Register 58, similar to register 38, is provided for timing purposes and is optional. The SKIP control signal for multiplexer 62 indicates to skip reading from the IDCT block, and is used when there exist skipped macroblocks or multiple skipped macroblocks. The SKIP signal is provided as is conventional in MPEG. If MPEG code word MACROBLOCK ADDRESS INCREMENT has a value greater than 1, or if MPEG code word MACROBLOCK ESCAPE is present, then SKIP is asserted high.

Adders 34, 54 and 66 are e.g. ripple adders. For higher performance, these alternatively are carry select adders or carry look-ahead adders. These higher performance adders would be especially useful for an MPEG 2 implementation. In order to accommodate the needed carry bit, the full frame reconstruction circuit of FIG. 3 is a 9 bit data path from the HREG register 38 through the VADD adder 54. Each adder 34, 54 and 66 is a rounding adder with a built-in one or two bit rounding function in order to output an 8 bit result. Note that the IDCT data signal is a 9 bit twos complement signal. The entire selector element 24 is a 9 bit data path except that, as described above, the adder 66 is a rounding adder outputting an 8 bit result as the signal WR DATA.

The following describes the logic used by selector element 24 with relation to the picture types of FIG. 1. The entire frame reconstruction circuit of FIG. 3 is used for reconstructing blocks or macroblocks in a video frame. The data flows for reconstructing respectively the I-type frame, the P-type frame and the B-type frame are as follows:

1. To reconstruct an I-type frame, the IDCT data flows to WR DATA; the horizontal and vertical interpolation elements 18 and 22 are not used. Thus signal INTRA is asserted high (value 1) and signal SKIP is asserted low (value 0).

2. To construct a P-type frame, both the outputs of the horizontal interpolation and vertical interpolation elements 18 and 22 and the IDCT data are used. In this case the INTRA signal is asserted low and the SKIP signal is also asserted low. However, for skipped blocks (versus macroblocks) the IDCT data is not used. Thus SKIP is asserted high or low depending on the type of macroblock. If the macroblock is a skip-type, SKIP is high; otherwise, SKIP is low.

3. To construct a B-type frame, the horizontal and vertical interpolation elements 18 and 22 are used once if there is only one direction of prediction, i.e. forward prediction or backward prediction. For bidirectional prediction, i.e. forward and backward prediction, horizontal and vertical interpolation elements are each used twice, once for forward and once for backward prediction.

Figure 4A:
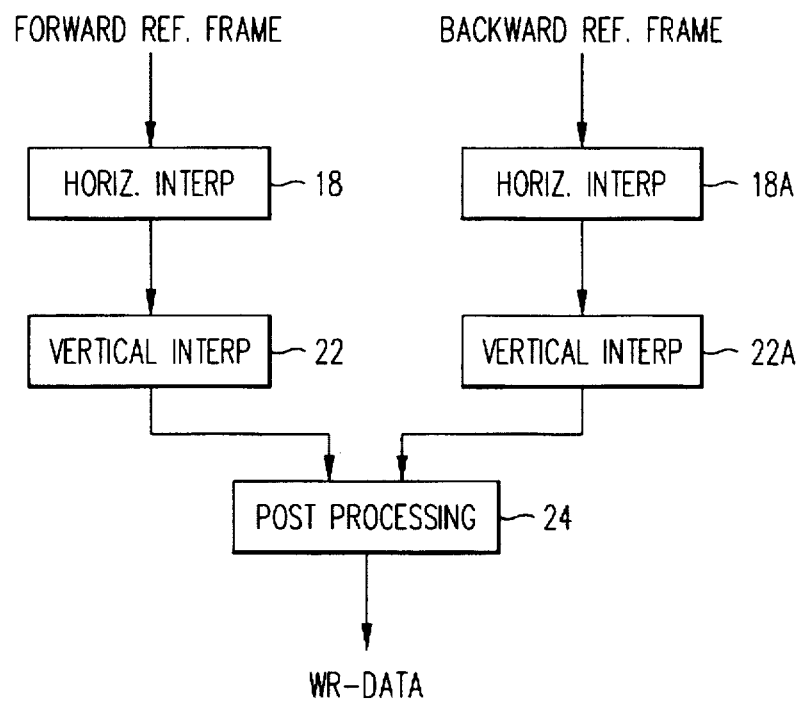
FIGS. 4A and 4B show respectively parallel and serial processing in a frame reconstruction circuit as used for reconstruction of a B-type frame in accordance with the present invention.

This is performed as shown in FIG. 4A by duplicated horizontal and vertical interpolation element circuitry for parallel processing of data coming from two different sources i.e., forward reference frame and backward reference frame. The first parallel path includes elements 18, 22 and 24; the second path includes elements 18A, 22A, and 24.

Figure 4B:
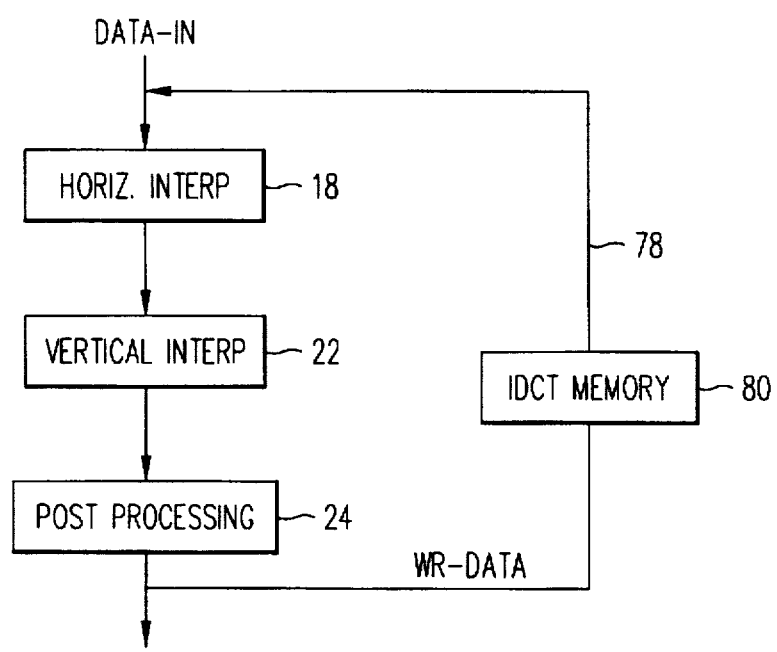

Alternatively as shown in FIG. 4B, this is performed by serial processing, using one set of horizontal and vertical interpolation elements 18, 22 in multiple passes, where the first pass is for one direction of prediction and a second pass is for the other direction of prediction. In this case the data path is used twice via a simple feedback loop 78, and there is an additional storage register 80 which stores intermediate data. This is called the IDCT memory which then in the next pass is read backwards for the other direction of prediction.

For reconstruction of the B frame hence the INTRA signal is asserted low, but since the IDCT data is not used, the SKIP signal is variously asserted high or low, as for the P-type frame.

Also, there is a frame reconstruction logic circuit (not shown) which conventionally decodes the picture type from a code word present in the MPEG bit stream.

Advantageously, the circuit of FIG. 3 processes one data entry for each clock cycle. Since the data arrives in two data entries every two clock cycles, which is equivalent to one data entry per clock cycle, no memory (such as FIFO memory) is needed for buffering between the memory and the data in terminal advantageously. On the output side at the WR DATA port, also no FIFO or other such memory is needed. Due to the three stage pipeline architecture described in the above-referenced first application, the buffers between the second (IDCT etc.) stage and the third (FR) can be used for storing intermediate result and final result data WR DATA. This eliminates the need for any output FIFO because the buffers between IDCT and FR can serve this purpose.

Also present in accordance with the invention is an error/warning correction process. If the compressed video bit stream is not able to be decoded in the picture layer (due to errors in the bit stream, the first pipeline stage (which is the VLD) generates an error signal. If the VLD cannot decode the bit stream in the slice, macroblock, or block layer, a warning signal is conventionally generated by the VLD. Recovery from such errors is made via an interrupt. In this case the VLD transmits the error signal and hence an interrupt is generated along with the error signal. Recovery from the warning signal is performed by skipping a current slice. When the frame reconstruction circuit of FIG. 3 receives the warning signal, it reconstructs the current slice as skipped macroblocks via the SKIP signal.

If the current picture is a P-type picture, in this case the frame reconstruction circuit reconstructs the remaining macroblocks in the slice with a reconstructed motion vector equal to zero and no DCT coefficients, as described above. For the case of a B-type picture, the macroblocks have the same macroblock type, (forward, backward, or both motion vectors) as the prior macroblock, differential motion vectors are equal to zero, and there are no IDCT coefficients used, as described above. Thus whatever reference frame was being used before the VLD became "stuck" continues in use. It is assumed that the motion vector is zero for a P-type frame, and there is no change in the motion vector for B-type frame. This is accomplished by conventional logic.

Advantageously, frame reconstruction in accordance with the present invention is economical in logic; for instance the circuit of FIG. 3 may be implemented for all 8 pixel data bits using approximately 2,800 gates.

Due to bus and memory inefficiencies, the circuit of the first above-referenced patent application decompresses a block of 8 pixels×8 pixels in less than 450 cycles. According to the MPEG standard, 840 clock cycles are available for playing (decompressing) 30 MPEG SIF format video frames per second. (SIF is the conventional MPEG 1 frame size of 352×240 pixels). Since the circuit is partitioned into a three-stage pipeline as described in the above-referenced patent application, where the first stage is the VLD, the second stage is IQ/IZZ/IDT, and frame reconstruction (FR) is the third stage, each stage processes an 8 pixel×8 pixel block within 840 cycles. Hence the actual maximum throughput of the video decompression circuit is considerably faster than the MPEG requirement.

While the presently disclosed embodiment is of a logic circuit including a number of conventional "hardwired" logic elements, the invention is not so limited. Alternatively the present frame reconstruction can be carried out in e.g. programmable logic or a programmable processor, given sufficient performance to process video data.

The above description is illustrative and not limiting; further modifications will be apparent to one skilled in the art in light of this disclosure and are intended to fall within the scope of the appended claims.

We claim:

1. A frame reconstruction circuit for reconstructing a block of video data that has been subject to compression, the block of video data including a plurality of pixels arranged in a horizontal and vertical array, and comprising:

a first interpolation element having an input terminal for receiving data representing the pixels of the block of video data, wherein the first interpolation element averages data representing a first pixel of the block of data with data representing a second pixel adjacent in a first direction in the block of data to the first pixel, and providing the averaged value at an output terminal;

a second interpolation element having an input terminal coupled to the output terminal of the first interpolation element, wherein the second interpolation element averages an averaged value from the first interpolation element with an averaged value from the first interpolation element associated with a set of pixels of the block of data adjacent in a second direction orthogonal to the first direction, the second interpolation element having an output terminal for providing the average of the two averaged values at the output terminal; and a selector element having an input terminal coupled to the output terminal of the second interpolation element, wherein the selector element selectably provides at its output terminal a value representing one of:
a) an externally provided signal;
b) the average of the two averaged values from the second interpolation element;
c) a sum of the externally provided signal and the average of the two averaged values.

2. The circuit of claim 1, further comprising a first storage element coupled between the output terminal of the first interpolation element and the input terminal of the second interpolation element, and a second storage element coupled between the output terminal of the second interpolation element and the input terminal of the selector element.

3. The circuit of claim 1, wherein the first interpolation element includes:

a flip-flop having an input terminal and an output terminal, the flip-flop input terminal being coupled to the input terminal of the first interpolation element;

a multiplexer having a control terminal, first and second input terminals, and an output terminal, the input terminals of the multiplexer being coupled respectively to the input terminal of the first interpolation element and to the output terminal of the flip-flop; and an adder having two input terminals coupled respectively to the output terminal of the multiplexer and the output terminal of the flip-flop, and having an output terminal coupled to the output terminal of the first interpolation element.

4. The circuit of claim 1, wherein the second interpolation element includes:

a shift register having an input terminal coupled to the input terminal of the second interpolation element and having an output terminal;

a multiplexer having two input terminals coupled respectively to the output terminal of the shift register and the input terminal of the second interpolation element, a control terminal, and an output terminal; and an adder having two input terminals coupled respectively to the output terminal of the shift register and to the output terminal of the multiplexer, and having an output terminal coupled to the output terminal of the second interpolation element.

5. The circuit of claim 4, wherein the shift register includes:

an n stage shift register element, where $n \geq 8$;

a one-stage shift register element; and a multiplexer having two input terminals connected respectively to an output terminal of the n stage shift register element and to an output terminal of the one-stage shift register element.

6. The circuit of claim 1, wherein the selector element includes:

a first multiplexer having two input terminals connected respectively to the output terminal of the second interpolation element and to a reference value;, and having an output terminal and a control terminal;

a second multiplexer having two input terminals connected respectively to receive the externally provided signal and a reference value, and having an output terminal and a control terminal; and an adder having two input terminals coupled respectively to the output terminals of the first and second multiplexers, and having an output terminal coupled to the output terminal of the selector element.

7. The circuit of claim 1, wherein the input terminal of the first interpolation element and the output terminal of the selector element are each 8-bit parallel data ports, and the circuit has at least an internal bus structure of at least 8 bits.

8. The circuit of claim 1, further comprising a second data path for bidirectional processing, comprising:

an additional first interpolation element; and an additional second interpolation element;

wherein each of the additional interpolation elements are serially coupled in parallel to the first and second interpolation elements.

9. The circuit of claim 1, further comprising a feedback path coupling the output terminal of the selector element to the input terminal of the first interpolation element.

10. The circuit of claim 1, wherein one of the first and second interpolation elements is a horizontal interpolation element, another being a vertical interpolation element.

11. The circuit of claim 1, wherein the compression is MPEG compression having I, P, and B type frames, and wherein the selector element selectably provides:

a value representing a) to reconstruct an I-type frame;

a value representing b) to reconstruct a B-type frame; and a value representing c) to reconstruct a P-type frame.

12. A method of reconstructing a block of video data that has been subject to compression, the block including a plurality of pixels arranged horizontally and vertically in an array, the method comprising:

first, selectively averaging values associated with two pixels adjacent in a first direction in the block;

second, selectively averaging two of the selectively averaged values associated with two sets of pixels adjacent in a second direction orthogonal in the first direction; and selectively providing as an output signal one of:
 a) an externally provided signal;
 b) a result of the second step of selectively averaging;
 c) a sum of the externally provided signal and the result of the second step of selectively averaging.

13. The method of claim 12, wherein the compression is MPEG compression having I, P, and B type frames, and where the step of providing as an output signal includes providing:
 a) to reconstruct an I-type frame;
 b) to reconstruct a B-type frame; and
 c) to construct a P-type frame.

* * * * *